(No Model.)  3 Sheets—Sheet 1.

F. MESSER.
MACHINE FOR DRESSING GRINDING ROLLS.

No. 334,262. Patented Jan. 12, 1886.

Witnesses
P. E. Renniemo
W. C. Coolies

Inventor
Fred Messer
By Coburn & Thacher
Attorneys

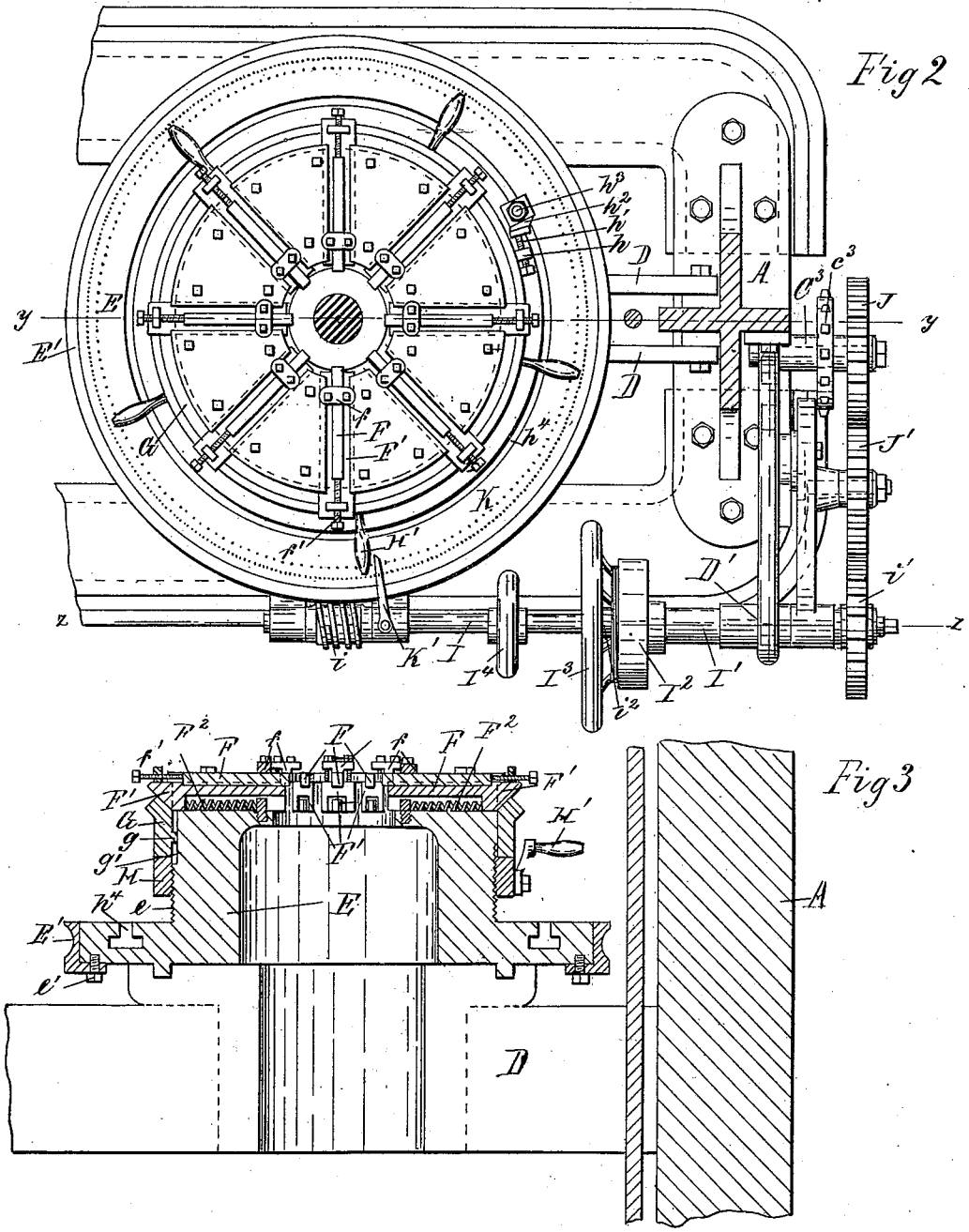

(No Model.) 3 Sheets—Sheet 3.

F. MESSER.
MACHINE FOR DRESSING GRINDING ROLLS.

No. 334,262. Patented Jan. 12, 1886.

Witnesses
P. E. Bennemo
N. C. Corles

Inventor
Fred Messer
By Coburn & Thacher
Attorneys

UNITED STATES PATENT OFFICE.

FRED MESSER, OF BELOIT, WISCONSIN.

MACHINE FOR DRESSING GRINDING-ROLLS.

SPECIFICATION forming part of Letters Patent No. 334,262, dated January 12, 1886.

Application filed November 26, 1884. Serial No. 148,948. (No model.)

*To all whom it may concern:*

Be it known that I, FRED MESSER, a citizen of the United States, and residing at Beloit, in the county of Rock and State of Wisconsin, have invented certain new and useful Improvements in Machines for Dressing Rollers for Grinding-Mills, which are fully set forth in the following specification, reference being had to the accompanying drawings, in which—

Figure 1:
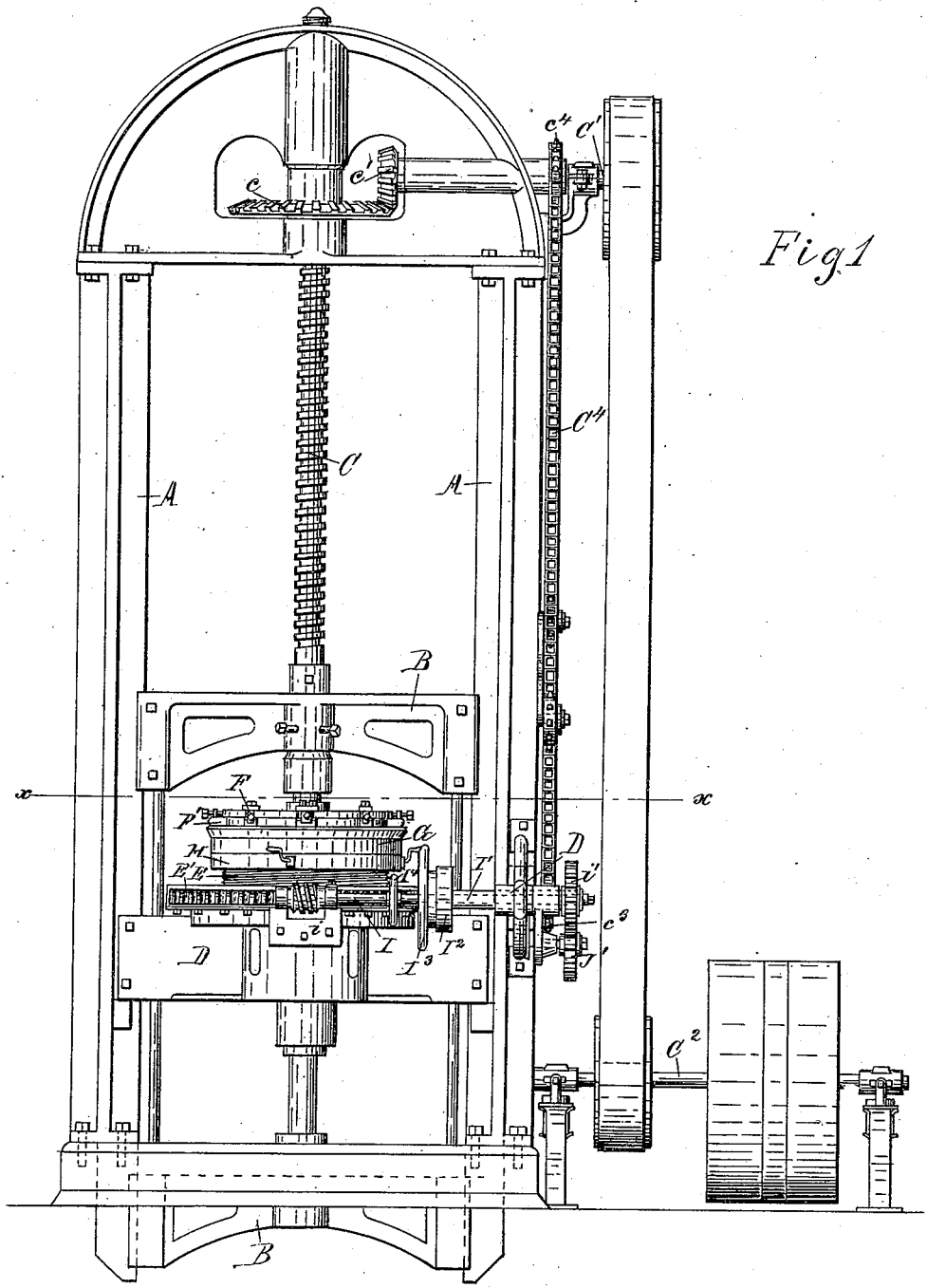
Figure 4:
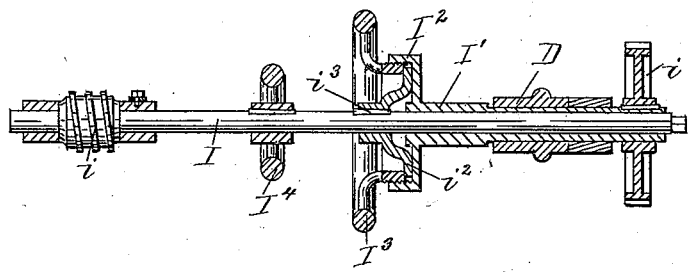
Figure 5:
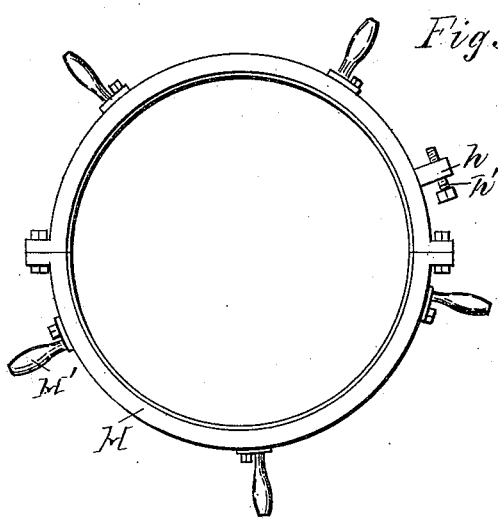
Figure 6:
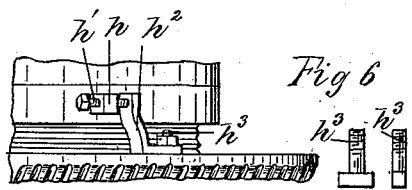
Figure 7:
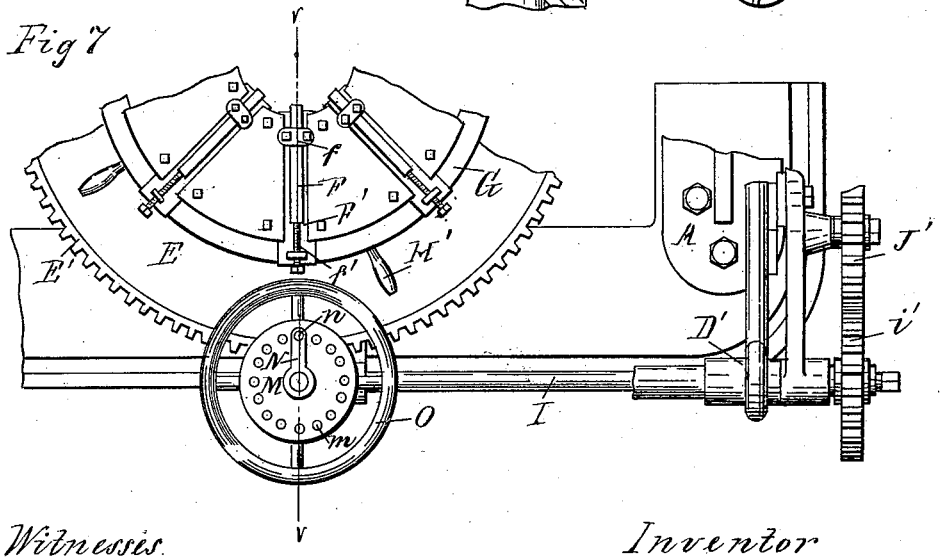

Figure 1 is an elevation of a machine embodying my invention; Fig. 2, a sectional view of the same on the line $x$ $x$, Fig. 1, and on an enlarged scale; Fig. 3, a sectional view on the line $y$ $y$, Fig. 2; Fig. 4, a sectional view on the line $z$ $z$, Fig. 2; Fig. 5, a detail view of the adjusting-ring detached; Fig. 6, a detail view of the stop; Fig. 7, a plan view of a modified form of my invention; and Fig. 8, a sectional view of the same on the line $v$ $v$, Fig. 7.

Like letters refer to like parts in all the figures.

My invention relates to machines for forming spiral grooves on cylindrical bodies, and more particularly to machines for dressing rollers for grinding-mills, it being in the nature of an improvement upon Patent No. 286,466, granted to me October 9, 1883; and it consists in certain novel features, which I will now proceed to describe, and then specifically point out in the claims.

In the drawings, A represents the main frame of the machine, in which slides a frame, B, in which the roller to be dressed is mounted, the said frame B being rigidly secured to the lower end of a screw, C, passing through a bevel-gear, $c$, which is threaded to receive the screw C, and meshes with a pinion, $c'$, on a shaft, C', mounted in the upper portion of the frame. All of these parts are constructed substantially as in my former patent hereinbefore mentioned, and therefore need no further description here. The shaft C' is driven from a counter-shaft, C², having the usual fast and loose pulleys to receive a cross and a straight belt from the main drive shaft in order to reverse the motion of the shaft C' and of the sliding frame B.

D indicates a cross-head, on which is mounted in any suitable manner the rotating head E, which carries the tools F. These tools, of which any convenient number may be employed, (in the drawings eight of them are shown,) are mounted upon suitable holders, F', being secured thereon by transverse clamping-bars $f$, which bear upon their upper sides and are bolted to the holders. The tools or cutters are adjusted relatively to the holders by means of screws $f'$, passing through suitable lugs on the holders and bearing against their rear ends. The outer ends of the tool-holders F' are beveled, as shown in Fig. 3, and rest upon the correspondingly-inclined upper edge of a ring, G, surrounding but capable of movement upon the cylindrical portion of the head E. This ring G rests upon another ring, H, which is internally screw-threaded to work upon the lower screw-threaded portion $e$ of the head E, the ring H being provided with suitable handles, H', for operating the same, and being preferably constructed in two parts, bolted together, as shown in Fig. 5, so as to be readily removable. The ring G is preferably provided with a projection, $g$, fitting in a groove, $g'$, in the head E, in order to guide the ring and prevent its rotating on the head, while leaving it free to move vertically.

F² indicates springs, which are arranged to force the tool-holders outward and hold them in contact with the ring G, these springs being preferably arranged as shown in Fig. 3, in which they are shown as arranged in grooves in the under side of each tool-holder, one end bearing against the downwardly-projecting end of the tool-holder and the other against a suitable pin or projection attached to the head E.

It will be seen that upon rotating the ring H, so as to screw it upward upon the head E, the ring G will also be forced upward, and its inclined upper end, bearing against the beveled ends of the tool holders F', will force the tool-holders and the cutters mounted thereon inward toward the center to any desired extent, and that upon rotating the ring H in the opposite direction the tools will be withdrawn from the center by means of the springs F².

In order to regulate the amount to which the tools project toward the center, I attach to or form upon the ring H a lug, $h$, through which passes a screw, $h'$, and in the path of this screw I arrange a projection, $h^2$, with which the screw will come in contact when the ring H has been turned so as to project the cutters to a sufficient extent. This projection or stop $h^2$ is made adjustable upon the horizontal or disk portion of the head E, preferably by means of a bolt, $h^3$, having a T-shaped head sliding in a similarly-shaped circular groove, $h^4$, in the side portion of the head E, and passing through the stop $h^2$, which is clamped upon it by a suitable nut.

The roller to be dressed passes, as in my former machine, down through the center of the head E, each of the cutters F forming a series of grooves therein from end to end during its passage. In order to give these grooves a spiral direction around the cylinder, a rotary motion is given to the head E by means of a shaft, I, mounted in suitable bearings on the cross-head D, and in an arm or bracket, D', attached to the main frame A, said shaft being connected by suitable gearing with a shaft, $C^3$, provided with a sprocket-wheel, $c^3$, over which, and over a similar sprocket-wheel, $c^4$, on the shaft C', passes a sprocket-chain, $C^4$, whereby the shaft $C^3$ is operated.

In Figs. 1, 2, 3, and 4 of the drawings the head E is shown as provided with a worm-gear, E', removably attached thereto by means of screws $e'$, passing through an inwardly-projecting flange on the gear, and the shaft I is provided with a worm or screw, $i$, to mesh with the worm-gear on the head E. In order to readily connect or disconnect the shaft I with or from the motive power, I mount loosely upon said shaft, near its outer end, a sleeve, I', and attach to the other end of said sleeve the pinion $i'$, by means of which the shaft is driven. At the inner end of said sleeve is a cup-shaped wheel, $I^2$, internally-threaded to receive the externally threaded hub of a clamping hand-wheel, $I^3$. A disk, $i^2$, is splined at $i^3$ on the shaft I, its periphery being arranged between the body of the wheel $I^2$ and the hub of the hand-wheel $I^3$, so that by rotating said hand-wheel the disk $i^2$ may be clamped against the wheel $I^2$, so as to rotate therewith, and, since the disk $i^2$ is splined on the shaft I, it will then cause the said shaft to rotate, and thereby impart a rotary motion to the head E. By rotating the hand-wheel $I^3$ in the opposite direction, the disk $i^2$ is unclamped, and the sleeve I' will rotate upon the shaft I without rotating the said shaft.

$I^4$ indicates a hand-wheel, which may be employed for rotating the shaft I when the said shaft is disconnected from the power.

It will be observed from an inspection of Fig. 4 that the sleeve I' extends through the outer bearing of the shaft I and surrounds the said shaft in the bearing, thereby causing both shaft and sleeve to rotate steadily and smoothly.

A pinion, J, on shaft $C^3$, and suitable intermediate gearing transmit the power from said shaft to pinion $i'$, and through the mechanism just described to the head E, this intermediate gearing being represented in the present instance by a pinion, J'. This pinion J' may be removed and a larger or smaller one substituted therefor, in order to regulate the rate of rotation of the head E relatively to the rate of feed of the roller to be dressed.

In forming a given number of grooves in a roller of given circumference it is frequently found that, owing to various circumstances, the roller is of a circumference either somewhat larger or somewhat smaller than its nominal size. In such a case if the grooves be formed consecutively it will be found that when the end of the work is reached there will be an ungrooved surface of more or less extent remaining between the first groove of the series formed by each tool and the last groove of the adjacent series formed by the next tool, owing to the fact that the real circumference of the roller is not exactly divisible by the number of grooves to be formed. In order to overcome this difficulty, I employ, in conjunction with the head E, a scale or indicator arranged in a circle and containing a number of equidistant distinctive marks, divisible by the number of tools used, and also by the number of grooves to be formed, so that by moving the head E a distance equal to the distance between these marks, or any given number of them, after each cut, the desired number of grooves will be formed in the roller, and the grooves will be evenly distributed and meet properly at the end, even where the real circumference of the roller is greater or less than its normal one.

In Fig. 2 of the drawings I have shown one form of scale, which consists of one or more series, K, (in the drawings two are shown,) of indentations or other suitable marks formed upon the horizontal portion of the head E, in a circle concentric with the said head, and, consequently, with the roller to be dressed. These scales or series of marks contain various numbers of marks, equal to the various numbers of grooves to be formed in the different rollers which may be dressed. These scales are used in conjunction with a pointer, K', attached to some fixed portion of the machine, and projecting over the said scale or scales. In the present instance the pointer is shown as attached to one of the inner bearings of the shaft I.

The operation of the device is as follows: The frame B being raised, and the roller to be dressed secured therein, the cutters F are adjusted by means of the screws $f'$ upon the holders $F'$, so as to all occupy the same relative position on their holders, and are then clamped in place on them. The stop $h^2$ having been adjusted to its proper position, the ring H is turned so as to raise the ring G and cause it to act on the beveled outer ends of the tool-holders $F'$ to force them inward, so as to cause the cutters to project to the desired extent toward the center, which will be effected when the screw $h'$ comes in contact with the stop $h^2$. The position of the cutters may be adjusted with great nicety by operating the screw $h'$. The head E having been turned by means of the hand-wheel $I^4$ on shaft I, so as to bring one of the marks of the scale to be employed in line with the pointer $K'$, the clamping-wheel $I^3$ is screwed up so as to connect the shaft I with the sleeve $I'$, and the machine is started, the roller being fed down through the head E, which is slowly rotated by the mechanism hereinbefore described. When the cutters have reached the end of the roller, the ring H is turned back, so as to slightly lower the ring G, when the springs $F^2$ will force the tool-holders and cutters outward to enable them to clear the roller in returning to their original position. The motion of the machine is then reversed by means of the fast and loose pulleys on the shaft $C^2$, and the frame B returns to its original position, as does also the head E. The machine being then stopped, the clamping-wheel $I^3$ is rotated to disconnect the shaft I from the operating mechanism, and the said shaft is then turned by means of the hand-wheel $I^4$, so as to bring the next mark of the scale in use in line with the pointer $K'$, when the series of operations above described are repeated until the entire circumference of the roller has been grooved.

It will be observed that as eight of the cutters F are employed, each cutter will groove one-eighth of the entire circumference of the roller, and that consequently only one-eighth of the scale K will be employed. Of course, with any other number of cutters a proportionate part of the scale will be employed to finish the whole surface.

In practice I contemplate employing tools or cutters each one of which has a notched or serrated cutting-edge, so that each tool at each cut from one end of the roller to the other will form a series of grooves instead of a single groove. When tools of this character are employed, the tool, instead of being moved the whole of its width after each cut, will be moved only a distance equal to one or two of these grooves, and any increase in the size of the grooves which may be necessary to distribute them evenly around a roller will be divided equally among the several grooves, making only a slight increase in the size of each one.

Figure 8:
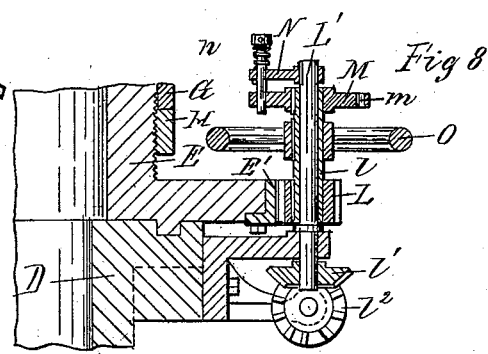

In Figs. 7 and 8 of the drawings I have shown a modified form of scale, which may be employed instead of the one above described. In this construction, $E'$ indicates a gear applied to the edge of the head E in the same manner as in the construction just described, and L indicates a pinion meshing therewith and mounted upon a sleeve, $l$, loosely surrounding a shaft, $L'$, carrying at its lower end a bevel-pinion, $l'$, gearing with a similar pinion, $l^2$, on the shaft I.

M indicates a disk attached to the upper end of the sleeve $l$, and having arranged in a circle therein a series of perforations, $m$, which forms in the present instance the scale to be employed. Secured to the upper end of the shaft $L'$, and projecting out over the disk M, is an arm, N, through which passes a pin, $n$, normally depressed by a suitably-arranged spring, the said pin being capable of passing through any one of the series of holes $m$ in the disk M.

O indicates a hand-wheel attached to the sleeve $l$, to operate the same by hand.

The operation of this device is as follows: The machine being in position to commence work, the sleeve $l$ is turned by means of the hand-wheel O, so as to bring one of the perforations $m$ in the disk M under the pin $n$, which will be forced by its spring through the said perforations, and thus connect the disk M and arm N, and consequently the sleeve $l$ and the shaft $L'$. On operating the machine, the pinion $l^2$ on the shaft I will rotate, by means of the pinion $l'$ and shaft $L'$, and consequently the sleeve $l$ and pinion L, which, meshing with the gear $E'$, will rotate the head E. Upon the completion of one series of grooves in the roller and the return of the parts to their original position the pin $n$ is raised so as to disconnect the sleeve $l$, which is then rotated by means of the hand-wheel O to bring the next perforation $m$ underneath the pin $n$, at the same time rotating the head E. When the pin $n$ drops into position again, the same series of operations are repeated, and so on until the roller is dressed.

It is obvious that many mechanical modifications in the details of construction may be made without departing from the principle of my invention.

Although I have shown the ring H as split or made in two parts, the said ring may be made all in one piece; but I prefer the construction shown and described, as the ring can then be readily detached in case of breaking or wearing out of the screw-thread therein without necessitating the removal of all the attachments of the head E above it. In the same manner, although I have shown and described the gear $E'$ as detachable, for the same reason it may be in one piece with the head. The screw $h'$ may be omitted and the projection $h$ used alone in conjunction with the stop $h^2$; but I deem the use of the screw preferable. I therefore do not wish to be understood as limiting myself to the precise details of construction hereinbefore set forth.

Having thus described my invention, what I claim as new, and desire to secure by Letters Patent, is—

1. The combination, with the head E, provided with worm-gear $E'$, of the shaft I, having worm $i$, and a sleeve, $I'$, mounted loosely on said shaft, and having a pinion, $i'$, suitably connected with the motive power, and means for connecting the said sleeve with the said shaft, substantially as and for the purposes specified.

2. The combination, with the head E, having worm-gear $E'$, of the shaft I, having worm $i$, disk $i^2$, splined on said shaft, and sleeve $I'$, mounted loosely on said shaft, and having at its outer end a pinion, $i'$, suitably connected with the motive power, and at its inner end the cup-shaped wheel $I^2$, threaded to receive the hand-wheel $I^3$, to clamp the disk $i^2$ against the wheel $I^2$, substantially as and for the purposes specified.

3. The combination, with the head E, of the tool-holders F′, sliding radially therein and having beveled outer ends, the ring G, sliding vertically on said head, and ring H, supporting ring G, and threaded internally to work upon the threaded portion $e$ of the head E, substantially as and for the purposes specified.

4. The combination, with the head E, of the tool-carriers F′, arranged to slide radially therein, and having beveled outer ends, vertically-adjustable ring G, for operating the tool-holders, and springs $F^2$, arranged to hold the tool-carriers in contact with the ring G, substantially as and for the purposes specified.

5. The combination, with the tool-holders F′, radially adjustable on the head E, of the tools F, screws $f'$, for adjusting said tools longitudinally on the tool-holders, and clamps $f$, for securing the tools on the holders when adjusted, substantially as and for the purposes specified.

6. The combination, with the nut-ring H, for adjusting the tool-holders, having a lug or projection thereon, of a stop adjustable on the head E, and arranged in the path of the said projection, substantially as and for the purposes specified.

7. The combination, with nut-ring H, having projection $h$ and screw $h'$, of stop $h^2$, adjustably secured upon head E by means of a T-shaped bolt, $h^3$, fitting in a correspondingly-shaped circular groove in the head, substantially as and for the purposes specified.

8. The combination, with the head E, carrying the cutters F, and having one or more scales, K, arranged in a circle upon its horizontal portion, of a fixed pointer, K′, extending over the said scale, and a shaft, I, for rotating the head, capable of being connected and disconnected with the motive power, and provided with a hand-wheel, $I^4$, substantially as and for the purpose specified.

9. The combination, with the head carrying the cutters, and having one or more scales arranged in a circle upon its horizontal portion, of a fixed pointer extending over the said scale, and a shaft for rotating the head, substantially as and for the purposes specified.

FRED MESSER.

Witnesses:
A. ALDRICH,
J. A. LEVIS.